(12) United States Patent
Sakai

(10) Patent No.: US 9,614,830 B2
(45) Date of Patent: Apr. 4, 2017

(54) RELAY APPARATUS, SYSTEM, RELAY METHOD, AND COMPUTER READABLE MEDIUM

(71) Applicant: FUJI XEROX CO., LTD., Tokyo (JP)

(72) Inventor: Yutaka Sakai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 9 days.

(21) Appl. No.: 14/620,400

(22) Filed: Feb. 12, 2015

(65) Prior Publication Data

US 2015/0269368 A1  Sep. 24, 2015

(30) Foreign Application Priority Data

Mar. 18, 2014 (JP) .................................. 2014-054624

(51) Int. Cl.
  *G06F 21/31* (2013.01)
  *H04L 29/06* (2006.01)
  *G06F 21/33* (2013.01)

(52) U.S. Cl.
  CPC .......... *H04L 63/0807* (2013.01); *G06F 21/33* (2013.01)

(58) Field of Classification Search
  None
  See application file for complete search history.

(56) References Cited

U.S. PATENT DOCUMENTS

| 5,655,077 | A | * | 8/1997 | Jones | G06F 21/6236 726/8 |
| 5,889,952 | A | * | 3/1999 | Hunnicutt | G06F 21/6218 709/219 |
| 8,195,940 | B2 | * | 6/2012 | Lioy | H04L 63/0892 455/410 |
| 8,407,769 | B2 | * | 3/2013 | Salmela | H04L 63/08 726/6 |

(Continued)

FOREIGN PATENT DOCUMENTS

| JP | 2012-113701 A | 6/2012 |
| JP | 2012-118971 A | 6/2012 |

OTHER PUBLICATIONS

Hotmanns et al., Cellular Authentication for Mobile and Internet Services, ISBN 978-0-470-72317-3, 2008.*

*Primary Examiner* — Peter Poltorak
(74) *Attorney, Agent, or Firm* — Sughrue Mion, PLLC

(57) ABSTRACT

A relay apparatus includes a storage unit, a first reception unit, a first request unit, a second reception unit, a second request unit, a third reception unit, and an access unit. The storage unit stores, for each user, authorization information for accessing a service providing apparatus. The first reception unit receives from a client apparatus an access request including a request for access to the service providing apparatus and identification information for identifying the user. The first request unit issues an acquisition request for the authorization information to a different relay apparatus. The second reception unit receives authorization informa- (Continued)

tion transmitted from the different relay apparatus. The second request unit requests the different relay apparatus to update the received authorization information. The third reception unit receives updated authorization information transmitted from the different relay apparatus. The access unit accesses the service providing apparatus by using the received updated authorization information.

14 Claims, 6 Drawing Sheets

(56) References Cited

U.S. PATENT DOCUMENTS

| | | | |
|---|---|---|---|
| 8,750,506 B2* | 6/2014 | Blom | 380/247 |
| 8,850,216 B1* | 9/2014 | Mikhailov | G06F 21/10 713/182 |
| 8,898,453 B2* | 11/2014 | Preiss | H04L 63/0807 713/150 |
| 8,996,857 B1* | 3/2015 | Akella | H04L 63/0815 713/153 |
| 9,131,026 B2* | 9/2015 | Hu | H04L 65/1069 |
| 9,253,246 B2* | 2/2016 | Mori | H04L 63/083 |
| 9,276,933 B2* | 3/2016 | Sng | H04L 63/0884 |
| 9,288,213 B2* | 3/2016 | Seo | H04L 63/0807 |
| 9,294,484 B2* | 3/2016 | Fukuda | H04L 63/104 |
| 2001/0000358 A1* | 4/2001 | Isomichi | G06F 21/41 726/13 |
| 2001/0054157 A1* | 12/2001 | Fukumoto | H04L 63/0281 726/11 |
| 2002/0007317 A1* | 1/2002 | Callaghan | G06Q 30/02 705/26.8 |
| 2002/0049916 A1* | 4/2002 | Nozaki | G06F 21/33 726/28 |
| 2002/0156906 A1* | 10/2002 | Kadyk | H04L 63/0281 709/229 |
| 2003/0220994 A1* | 11/2003 | Zhu | H04L 12/14 709/223 |
| 2003/0226036 A1* | 12/2003 | Bivens | H04L 63/0815 726/8 |
| 2004/0162998 A1* | 8/2004 | Tuomi | H04L 63/083 726/3 |
| 2005/0289643 A1* | 12/2005 | Sato | H04L 63/0407 726/4 |
| 2006/0053296 A1* | 3/2006 | Busboom | H04L 63/083 713/182 |
| 2006/0089121 A1* | 4/2006 | Elgebaly | H04L 63/0272 455/410 |
| 2006/0174104 A1* | 8/2006 | Crichton | G06F 21/33 713/155 |
| 2006/0230265 A1* | 10/2006 | Krishna | H04L 63/08 713/158 |
| 2007/0136794 A1* | 6/2007 | Chin | H04L 63/08 726/5 |
| 2007/0220271 A1* | 9/2007 | Law | G06F 21/606 713/185 |
| 2007/0234408 A1* | 10/2007 | Burch | G06F 21/31 726/6 |
| 2007/0245414 A1* | 10/2007 | Chan | H04L 63/0823 726/12 |
| 2008/0052771 A1* | 2/2008 | Delmond | G06F 21/33 726/9 |
| 2008/0072301 A1* | 3/2008 | Chia | G06F 21/41 726/8 |
| 2009/0165095 A1* | 6/2009 | Ishikawa | H04L 67/14 726/4 |
| 2009/0313353 A1* | 12/2009 | Lou | G06F 21/10 709/219 |
| 2009/0328178 A1* | 12/2009 | McDaniel | G06F 21/31 726/9 |
| 2010/0211995 A1* | 8/2010 | Yoshida | G06F 21/33 726/4 |
| 2010/0217982 A1* | 8/2010 | Brown | H04L 63/0807 713/168 |
| 2010/0296481 A1* | 11/2010 | Weniger | H04L 63/0807 370/331 |
| 2011/0154443 A1* | 6/2011 | Thakur | G06F 21/41 726/3 |
| 2011/0202988 A1* | 8/2011 | Otranen | H04L 9/3213 726/8 |
| 2011/0249079 A1* | 10/2011 | Santamaria | H04M 7/0057 348/14.02 |
| 2012/0011358 A1* | 1/2012 | Masone | G06F 21/305 713/153 |
| 2012/0113471 A1 | 5/2012 | Shimada et al. | |
| 2012/0311686 A1* | 12/2012 | Medina | H04L 63/0807 726/7 |
| 2013/0019295 A1* | 1/2013 | Park | H04L 9/3213 726/7 |
| 2013/0174221 A1* | 7/2013 | Tanaka | H04L 63/0884 726/3 |
| 2013/0198211 A1* | 8/2013 | Kohkaki | G06F 17/30569 707/756 |
| 2013/0198806 A1* | 8/2013 | Takatsu | G06F 3/1222 726/3 |
| 2013/0321859 A1* | 12/2013 | Ohara | H04N 1/00244 358/1.15 |
| 2014/0157373 A1* | 6/2014 | Tanaka | H04L 63/10 726/4 |
| 2015/0371031 A1* | 12/2015 | Ueno | G06F 21/45 726/4 |

\* cited by examiner

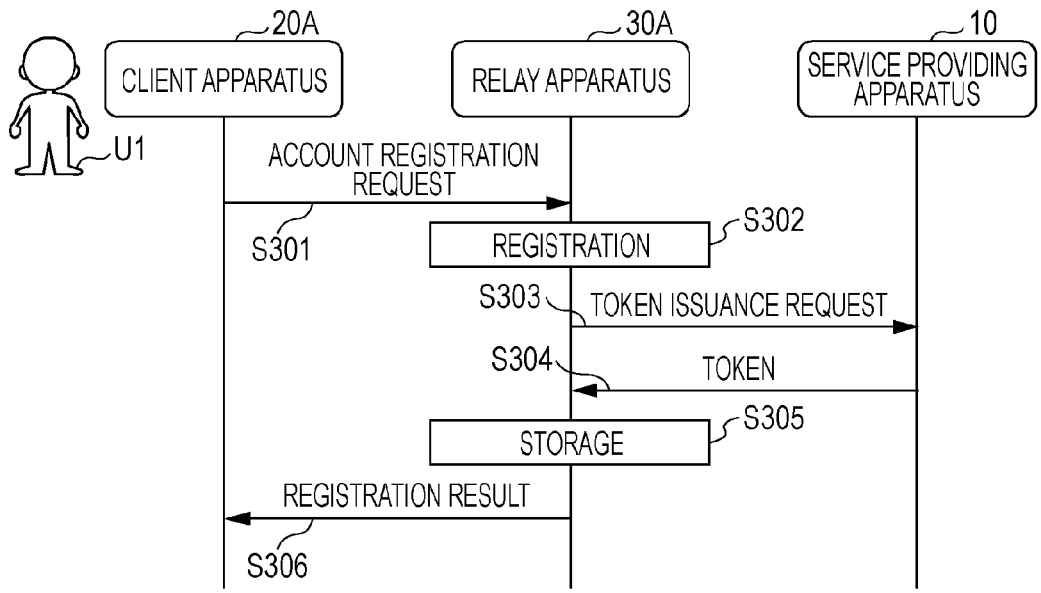
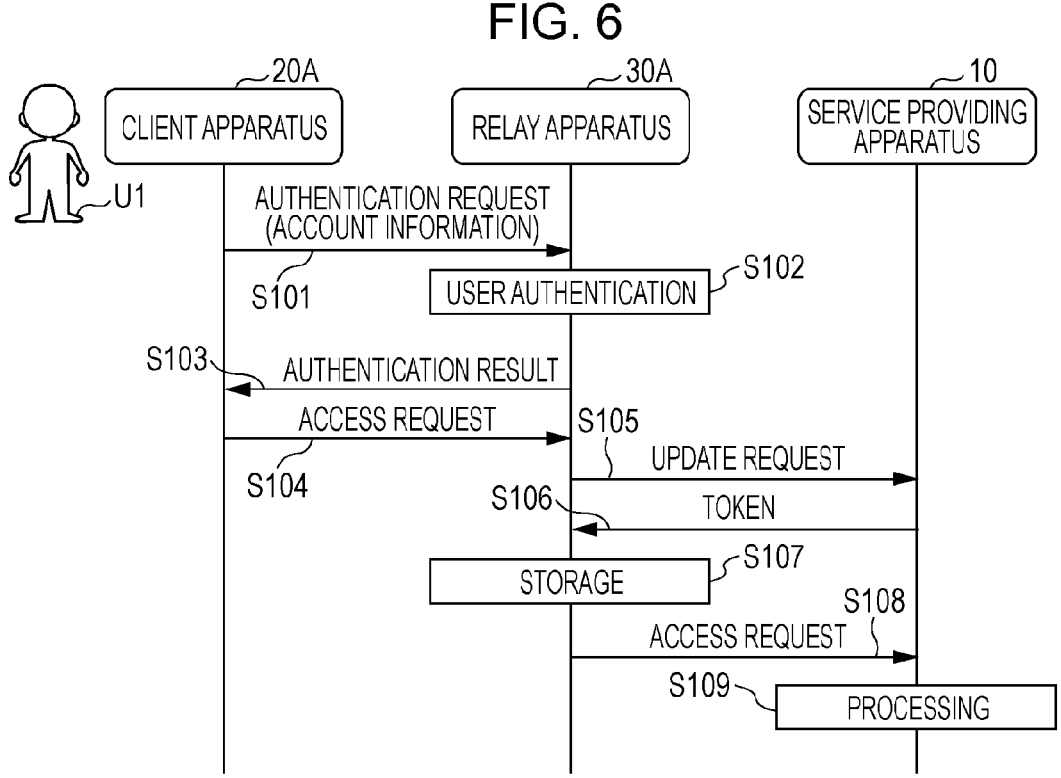

RELAY APPARATUS, SYSTEM, RELAY METHOD, AND COMPUTER READABLE MEDIUM

CROSS-REFERENCE TO RELATED APPLICATIONS

This application is based on and claims priority under 35 USC 119 from Japanese Patent Application No. 2014-054624 filed Mar. 18, 2014.

BACKGROUND

Technical Field

The present invention relates to a relay apparatus, a system, a relay method, and a computer readable medium.

SUMMARY

According to an aspect of the invention, there is provided a relay apparatus including a storage unit, a first reception unit, a first request unit, a second reception unit, a second request unit, a third reception unit, and an access unit. The storage unit stores, for each user, authorization information for accessing a service providing apparatus. The first reception unit receives from a client apparatus an access request including a request for access to the service providing apparatus and identification information for identifying the user. The first request unit issues, when authorization information corresponding to the identification information included in the received access request is not stored in the storage unit, an acquisition request for the authorization information to a different relay apparatus. The second reception unit receives authorization information transmitted from the different relay apparatus as a response to the acquisition request. The second request unit requests, when at least any one of the received authorization information and the received access request satisfies a predetermined condition, the different relay apparatus to update the received authorization information. The third reception unit receives updated authorization information transmitted from the different relay apparatus as a response to the update request. The access unit accesses the service providing apparatus by using the received updated authorization information.

BRIEF DESCRIPTION OF THE DRAWINGS

Exemplary embodiments of the present invention will be described in detail based on the following figures, wherein:

FIG. 5 is a sequence diagram illustrating an example of an operation of the system;

FIG. 6 is a sequence diagram illustrating an example of an operation of the system.

DETAILED DESCRIPTION

1. Configuration

Figure 1:
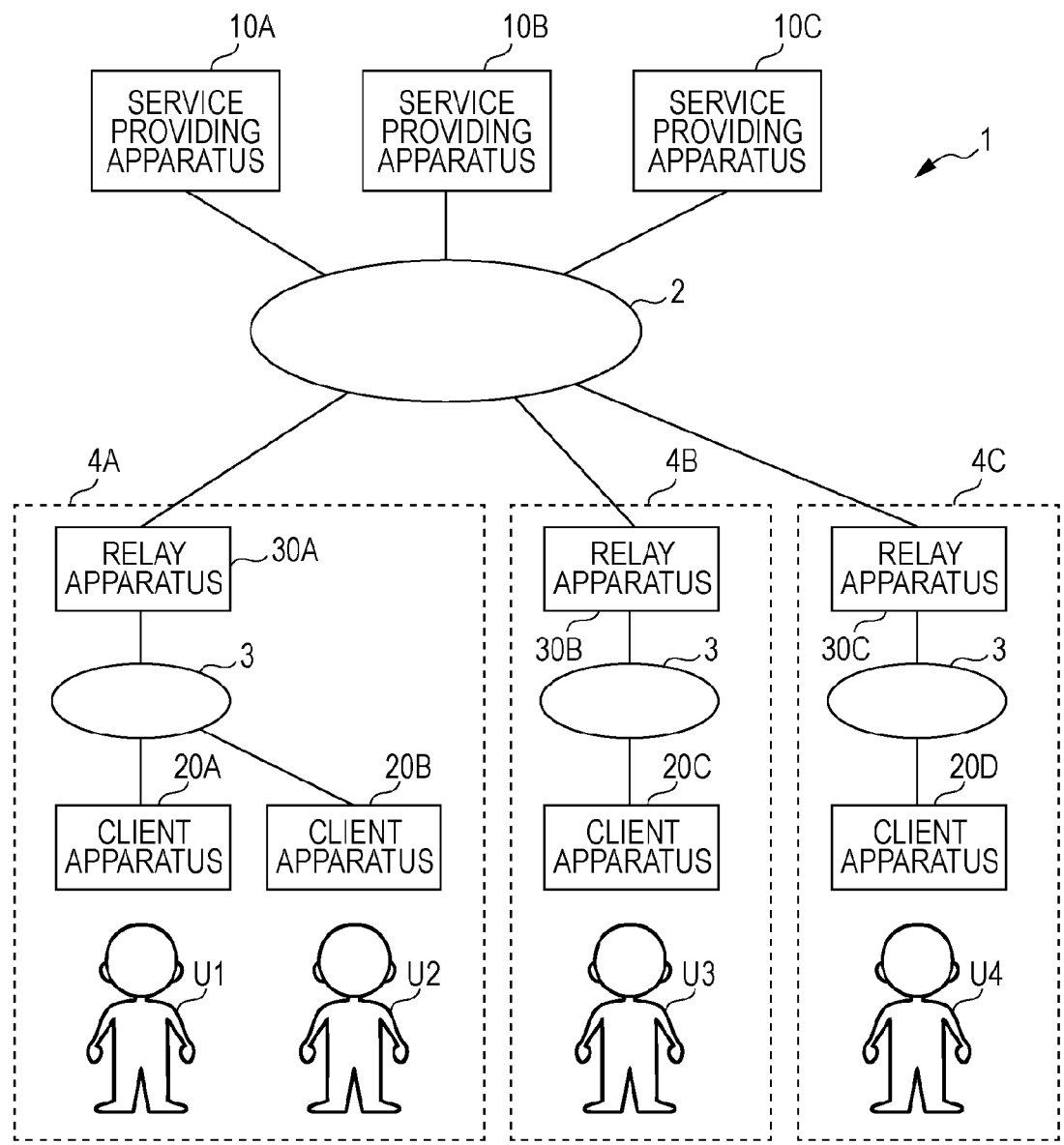
FIG. 1 is a diagram illustrating the entire configuration of a system.

FIG. 1 is a diagram illustrating the entire configuration of a system 1 according to an exemplary embodiment. The system 1 includes service providing apparatuses 10A, 10B, and 10C, client apparatuses 20A, 20B, 20C, and 20D, and relay apparatuses 30A, 30B, and 30C. In the explanation provided below, the service providing apparatuses 10A, 10B, and 10C will be collectively referred to as "service providing apparatuses 10" when there is no need to distinguish from one another. Furthermore, in the explanation provided below, the client apparatuses 20A, 20B, and 20C will be collectively referred to as "client apparatuses 20" when there is no need to distinguish from one another. Furthermore, in the explanation provided below, the relay apparatuses 30A, 30B, and 30C will be collectively referred to as "relay apparatuses 30" when there is no need to distinguish from one another. The service providing apparatuses 10 and the relay apparatuses 30 are connected to one another via a communication line 2, such as the Internet. The client apparatuses 20 and the relay apparatuses 30 are connected to the communication line 2 via communication lines 3, such as local area networks (LANs). The client apparatuses 20 may be connected to the communication line 2 without the communication lines 3 or the relay apparatuses 30 therebetween.

The service providing apparatuses 10 provide various services including a data storing service. These services may be so-called cloud services. Tokens representing authorization for accessing the service providing apparatuses 10 (an example of authorization information) are necessary for the client apparatuses 20 to access the service providing apparatuses 10. In this example, the tokens have a data structure in which account identification information and authorization are described. The client apparatuses 20 are, for example, image processing apparatuses and are used, for example, when users use services provided from the service providing apparatuses 10. The client apparatuses 20 may have multiple functions including a copying function, a printing function, and a facsimile function, as well a scanner function. The relay apparatuses 30 have a function for relaying data exchange between the client apparatuses 20 and the service providing apparatuses 10.

In this example, the locations where the client apparatuses 20 are installed are categorized into multiple regions 4A, 4B, and 4C. The relay apparatus 30A relays data exchange between a service providing apparatus 10 and the client apparatuses 20A and 20B, which are installed in the region 4A. The relay apparatus 30B relays data exchange between a service providing apparatus 10 and the client apparatus 20C, which is installed in the region 4B. The relay apparatus 30C relays data exchange between a service providing apparatus 10 and the client apparatus 20D, which is installed in the region 4C. In the explanation provided below, the regions 4A, 4B, and 4C will be collectively referred to as "regions 4" when there is no need to distinguish from one another.

A user of the system 1 belongs to any one of the regions 4A, 4B, and 4C. In the explanation provided below, for convenience of explanation, a region 4 to which a user belongs will be referred to as a "home region" of the user, while a region 4 to which a user does not belong will be referred to as an "away region" of the user. In this example, the region 4A is a home region of the user U1 and the user U2, and the region 4B and the region 4C are away regions of the user U1 and user U2. A user usually performs various operations using a client apparatus 20 installed in a region 4 to which the user belongs. In a relay apparatus 30 in a region 4 to which a user belongs, information on the user (user information) including account information of the user is registered. The relay apparatus 30 performs processing including user authentication, based on the user information registered in the relay apparatus 30. In the explanation provided below, the users U1, U2, U3, and U4 will be collectively referred to as "users U" when there is no need to distinguish from one another.

Figure 2:
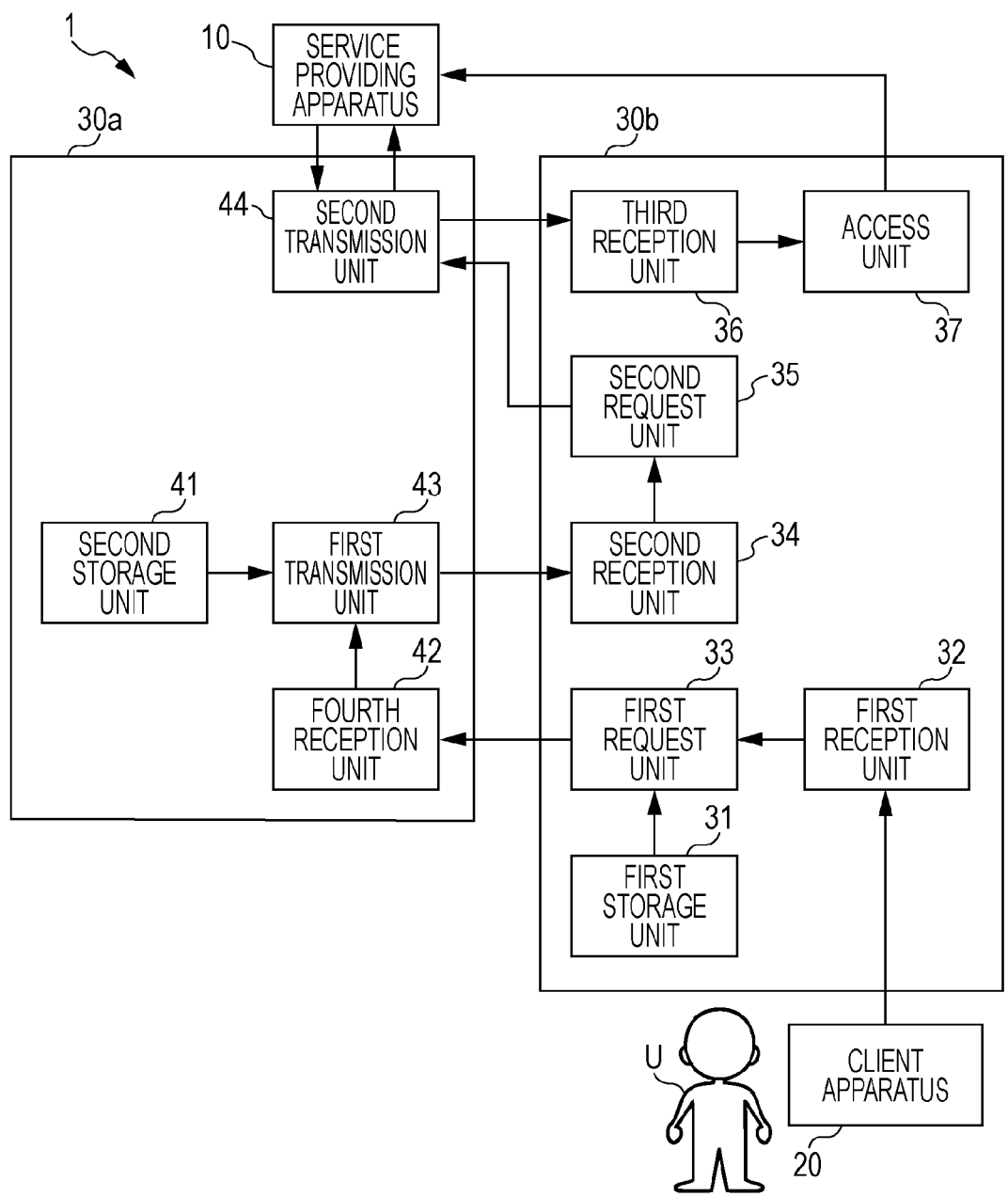
FIG. 2 is a diagram illustrating a functional configuration of the system.

FIG. 2 is a diagram illustrating a functional configuration of the system 1. The system 1 includes the service providing apparatus 10, the client apparatus 20, the relay apparatus 30a and the relay apparatus 30b. The relay apparatus 30a is a relay apparatus installed in a home region of a user U (an example of a second relay apparatus). The relay apparatus 30b is a relay apparatus installed in an away region of the user U (an example of a first relay apparatus). The relay apparatus 30b includes a first storage unit 31, a first reception unit 32, a first request unit 33, a second reception unit 34, a second request unit 35, a third reception unit 36, and an access unit 37. The first storage unit 31 stores, for each user, authorization information for accessing the service providing apparatus 10. The first reception unit 32 receives from the client apparatus 20 an access request including a request for access to the service providing apparatus 10 and identification information for identifying a user. When authorization information corresponding to the identification information included in the access request received by the first reception unit 32 is not stored in the first storage unit 31, the first request unit 33 issues to the relay apparatus 30a an acquisition request for authorization information. The second reception unit 34 receives the authorization information transmitted from the relay apparatus 30a as a response to the acquisition request. When any one of the authorization information received by the second reception unit 34 and the access request received by the first reception unit 32 satisfies a predetermined condition, the second request unit 35 requests the relay apparatus 30a to update the received authorization information. The third reception unit 36 receives the updated authorization information transmitted from the relay apparatus 30a as a response to the update request. The access unit 37 accesses the service providing apparatus 10 by using the updated authorization information received by the third reception unit 36.

The relay apparatus 30a includes a second storage unit 41, a fourth reception unit 42, a first transmission unit 43, and a second transmission unit 44. The second storage unit 41 stores, for each user, authorization information for accessing the service providing apparatus 10. The fourth reception unit 42 receives an acquisition request for authorization information from the relay apparatus 30b. The first transmission unit 43 reads from the second storage unit 41 authorization information corresponding to the acquisition request received by the fourth reception unit 42, and transmits the read authorization information to the relay apparatus 30b. When receiving an update request for authorization information from the relay apparatus 30b, the second transmission unit 44 transmits to the service providing apparatus 10 an update request for the authorization information corresponding to the received update request. The second transmission unit 44 also transmits to the relay apparatus 30b the updated authorization information transmitted from the service providing apparatus 10.

Figure 3:
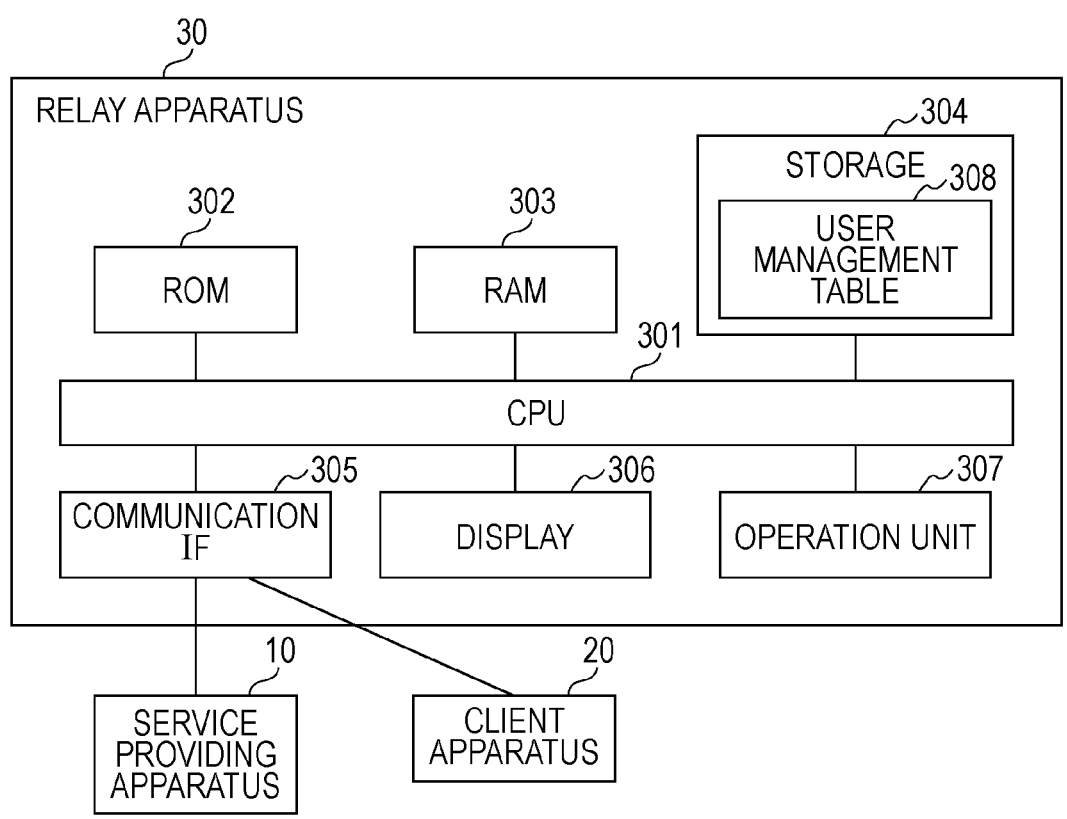
FIG. 3 is a diagram illustrating a hardware configuration of a relay apparatus.

FIG. 3 is a diagram illustrating an example of the hardware configuration of the relay apparatus 30. The relay apparatus 30 is a computer apparatus which includes a central processing unit (CPU) 301, a read only memory (ROM) 302, a random access memory (RAM) 303, a storage 304, and a communication interface (IF) 305. The CPU 301 is a control device (processor) which controls each unit of the relay apparatus 30. The ROM 302 is a non-volatile storage device which stores a program and data. The RAM 303 is a volatile principal storage device which functions as an operation area to be used when the CPU 301 executes a program. The storage 304 is a non-volatile auxiliary storage device which stores a program and data. The communication IF 305 is an interface for performing communication via the communication line 2. In particular, in this example, the communication IF 305 is an interface for communicating with the service providing apparatus 10 and the client apparatus 20. The relay apparatus 30 also includes a display 306 and an operation unit 307.

In this example, when a relay program stored in the storage 304 (or the ROM 302) is executed by the CPU 301, the functions illustrated in FIG. 2 are implemented. The CPU 301 which is executing a relay program, or the CPU 301 and the communication IF 305 are examples of the first reception unit 32, the first request unit 33, the second reception unit 34, the second request unit 35, the third reception unit 36, the access unit 37, the fourth reception unit 42, the first transmission unit 43, and the second transmission unit 44. The storage 304 is an example of the first storage unit 31 and the second storage unit 41. The detailed explanation of the hardware configuration of the service providing apparatus 10 and the client apparatus 20 will be omitted. The service providing apparatus 10 is a computer apparatus which includes a CPU, a ROM, a RAM, a storage, and a communication interface. The client apparatus 20 is an image forming apparatus which includes a CPU, a ROM, a RAM, a storage, an operation unit, a display, an image reading unit, and an image forming unit.

The storage 304 stores a user management table 308. The user management table 308 is a table used for management of information regarding a user (user information). User information of a user who belongs to a region 4 corresponding to the relay apparatus 30 is registered in the user management table 308. That is, user information registered in the user management table 308 differs among the relay apparatuses 30. In the example of FIG. 1, user information of the user U1 and user information of the user U2 are stored in the user management table 308 of the relay apparatus 30A and not stored in the user management table 308 of the relay apparatus 30B or the relay apparatus 30C. Furthermore, user information of the user U3 is stored in the user management table 308 of the relay apparatus 30B and not stored in the user management table 308 of the relay apparatus 30A or the relay apparatus 30C. Furthermore, user information of the user U4 is stored in the user management table 308 of the relay apparatus 30C and not stored in the user management table 308 of the relay apparatus 30A or the relay apparatus 30B.

Figure 4:
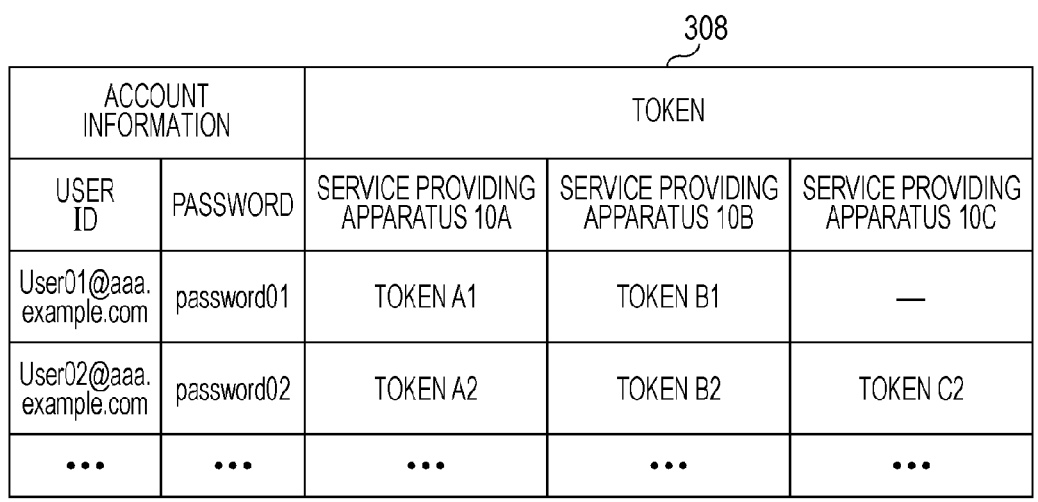
FIG. 4 is a diagram illustrating an example of a user management table.

FIG. 4 is a diagram illustrating an example of the user management table 308. Account information and a token for each service providing apparatus 10 are stored in association with each other in the user management table 308. Account information is information necessary for logging into the relay apparatus 30. Account information includes a user ID and a password. A user ID is an example of identification information for identifying a user. The user ID may be a user name or an email address allocated to the user. A token is information representing authorization for accessing the service providing apparatus 10. The token is issued for each user by the service providing apparatus 10 and is stored in the user management table 308. In this example, a token "token A1" for the service providing apparatus 10A and a token "token B1" for the service providing apparatus 10B are stored in association with a user ID "User01@aaa.example.com" in the user management table 308.

A token stored in the user management table 308 includes information indicating the term of validity of the token and information indicating the details of authorization for accessing the service providing apparatus 10 (for example, permission for reference of data, permission of reference and update of data, etc.). The term of validity is set for each token when the service providing apparatus 10 issues the token. The token becomes invalid when the set term of validity has expired. When the term of validity has expired, the relay apparatus 30 in which account information of a user is registered requests the service providing apparatus 10 to perform update processing for the token, and the service providing apparatus 10 issues a new token.

2. Operation

Next, an operation of the system 1 will be explained. A user usually uses a client apparatus 20 installed in a home region of the user. First, a user registers an account to a home relay apparatus 30 in the home region of the user through a home client apparatus 20 installed in the home region of the user. Then, in the case where the user intends to use a service provided by a service providing apparatus 10, the user accesses the service providing apparatus 10 through the home client apparatus 20 installed in the home region. Meanwhile, the user may be moved temporarily to an away region, for example, on a business trip. In such a case, the user uses a service through an away client apparatus 20 installed in an away region of the user. In the explanation provided below, an operation for registering an account to the relay apparatus 30, an operation performed by the user to use a service through the home client apparatus 20 installed in the home region, and an operation performed by the user to use a service through the away client apparatus 20 installed in the away region will be explained.

2-1. Account Registration Operation

FIG. 5 is a sequence diagram illustrating an operation performed by a user to register an account to a relay apparatus 30. In this example, an operation performed by the user U1 to register an account to the relay apparatus 30A in the region 4A through the client apparatus 20A will be explained. First, the user U1 issues an account registration request to the relay apparatus 30A through the client apparatus 20A. Specifically, the user U1 inputs account information for registering the account to the relay apparatus 30A by performing an operation using the operation unit of the client apparatus 20A. For example, the user U1 inputs "User01@aaa.example.com" as a user ID and "password01" as a password.

In step S301, the client apparatus 20A transmits to the relay apparatus 30A an account registration request including the account information input by the user operation. In step S302, the CPU 301 of the relay apparatus 30A registers the account information included in the account registration request to the relay apparatus 30A. That is, the CPU 301 stores the account information included in the account registration request into the user management table 308.

The CPU 301 also requests the service providing apparatus 10 to issue a token necessary for the user to use a service provided by the service providing apparatus 10. In step S303, the CPU 301 requests the service providing apparatus 10 to issue the token. The service providing apparatus 10 receives the token issuance request from the relay apparatus 30A. In step S304, the service providing apparatus 10 issues the token and transmits the token to the relay apparatus 30A. The relay apparatus 30A receives the token from the service providing apparatus 10. In step S305, the CPU 301 of the relay apparatus 30A stores the received token into the user management table 308 in association with the user ID of the user U1. In step S306, the CPU 301 notifies the client apparatus 20A of normal completion of the registration of the account.

2-2. Operation Performed when Service is Used in Home Region

FIG. 6 is a sequence diagram illustrating an operation performed by a user to use a service through a home client apparatus 20 in a home region of the user. In this example, an operation performed by the user U1 who belongs to the region 4A to use a service through the client apparatus 20A will be explained. First, the user U1 logs into the relay apparatus 30A through the client apparatus 20A. Specifically, the user U1 inputs account information for logging into the relay apparatus 30A by performing an operation using the operation unit of the client apparatus 20A. For example, when the account information for logging into the relay apparatus 30A includes the user ID "User01@aaa.example.com" and the password "password01", the user U1 inputs the user ID and the password.

In step S101, the client apparatus 20A transmits to the relay apparatus 30A an authentication request including the account information input by the user operation. In step S102, the CPU 301 of the relay apparatus 30A performs user authentication in response to the authentication request received from the client apparatus 20A. Specifically, the CPU 301 performs user authentication on the basis of whether or not the account information included in the authentication request is stored in the user management table 308. When the account information included in the authentication request is stored in the user management table 308, user authentication is successful. In contrast, when the account information included in the authentication request is not stored in the user management table 308, user authentication is failed. In this example, since the account information of the user U1 is registered in the user management table 308, user authentication is successful. When user authentication is successful, the CPU 301 transmits an authentication result of the user authentication performed in step S102 to the client apparatus 20A in step S103.

When the client apparatus 20A receives an authentication result indicating that user authentication has been successful, the process proceeds to step S104. In contrast, when the client apparatus 20A receives an authentication result indicating that user authentication has been failed, the process is terminated without performing the subsequent processing. In this example, the client apparatus 20A receives an authentication result indicating that user authentication has been successful, and the process proceeds to step S104.

In step S104, the client apparatus 20A transmits to the relay apparatus 30A an access request to the service providing apparatus 10. The access request includes information including the user ID of the user U1 and the type of a service to be provided by the service providing apparatus 10. The CPU 301 of the relay apparatus 30A receives the access request from the client apparatus 20A. The CPU 301 reads from the user management table 308 a token corresponding to the user ID included in the received access request. At this time, the CPU 301 refers to the term of validity of the read token. If the term of validity has expired, the CPU 301 requests the service providing apparatus 10 to update the token. In step S105, the CPU 301 transmits a token update request to the service providing apparatus 10. The service providing apparatus 10 issues a new token in response to the update request from the relay apparatus 30A. In step S106, the service providing apparatus 10 transmits the issued token to the relay apparatus 30A. The CPU 301 of the relay apparatus 30A receives the updated token from the service providing apparatus 10. In step S107, the CPU 301 stores the received token into the user management table 308. If the term of validity of the token has not expired, the processing from step S105 to step S107 is not performed.

In step S108, the CPU 301 performs an access request to the service providing apparatus 10 by using the updated token. That is, the CPU 301 transmits to the service providing apparatus 10 the updated token and the access request received in step S104 from the client apparatus 20A. The service providing apparatus 10 receives the access request and the token, and determines, based on the received token, whether or not to permit access to the service providing apparatus 10. In step S109, when the service providing apparatus 10 permits access to the service providing apparatus 10, the service providing apparatus 10 performs processing corresponding to the received access request. For example, the service providing apparatus 10 performs processing regarding the service corresponding to the type of the service included in the received access request.

2-3. Operation Performed when Service is Used in Away Region

Figure 7:
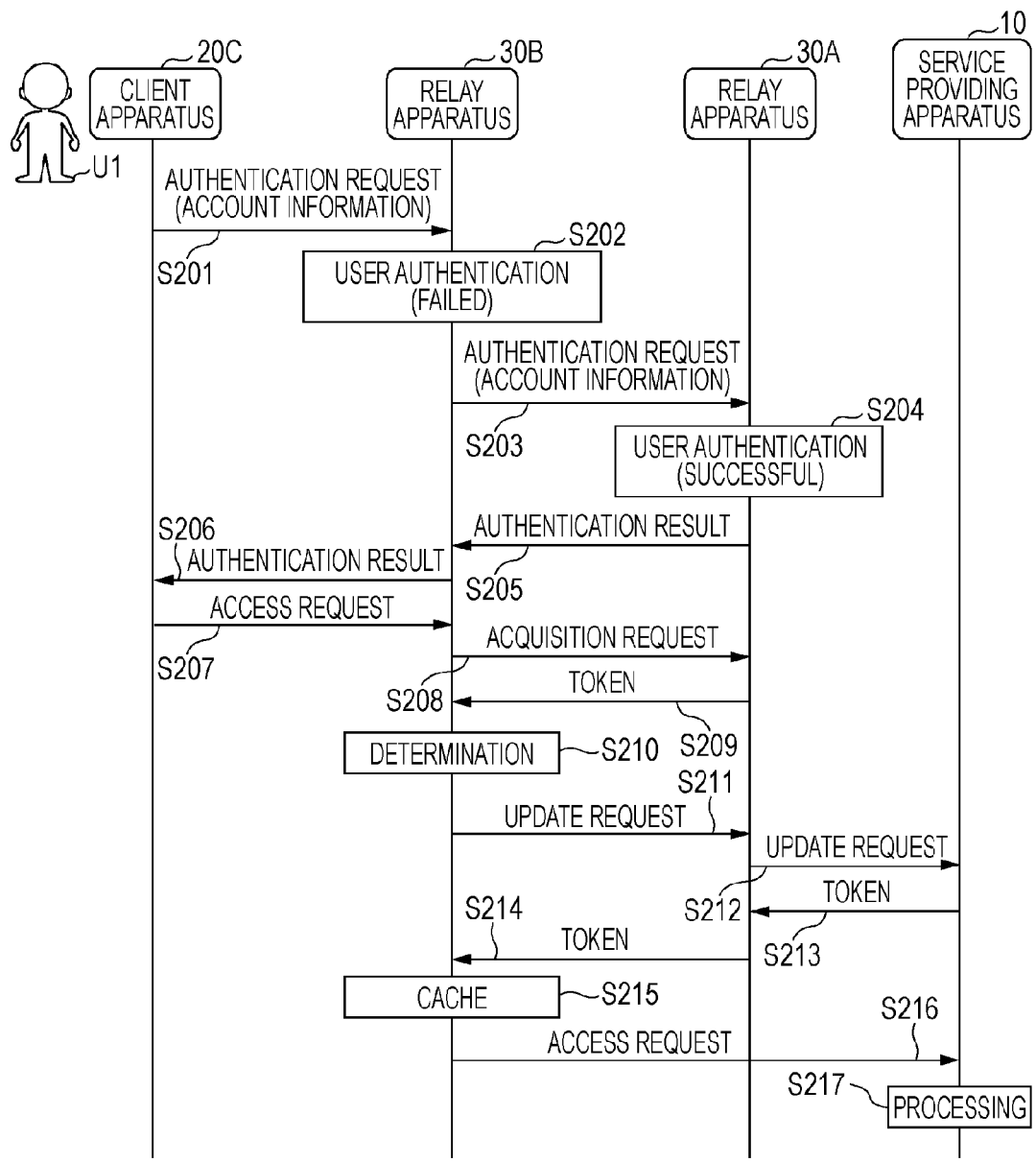
FIG. 7 is a sequence diagram illustrating an example of an operation of the system.

FIG. 7 is a sequence diagram illustrating an operation performed by a user to use a service through the client apparatus 20 in an away region of the user. In this example, an operation performed by the user U1 who belongs to the region 4A to use a service through the client apparatus 20C in an away region of the user U1 (that is, via the relay apparatus 30B) will be explained. As described above, user information of each user is stored only in the relay apparatus 30 in the home region of the user but is not stored in the relay apparatus 30 of the away region of the user. That is, user information of the user U1 is not stored in the relay apparatus 30B.

First, the user U1 logs into the relay apparatus 30B through the client apparatus 20C. Specifically, the user U1 inputs account information for logging into the relay apparatus 30B by performing an operation using the operation unit of the client apparatus 20C. For example, when account information for logging into the relay apparatus 30A includes the user ID "User01@aaa.example.com" and the password "password01", the user U1 inputs the user ID and the password.

In step S201, the client apparatus 20C transmits to the relay apparatus 30B an authentication request including the account information input by the user operation. In step S202, the CPU 301 of the relay apparatus 30B performs user authentication in response to the authentication request received from the client apparatus 20C. When the account information included in the authentication request is stored in the user management table 308, user authentication is successful. In contrast, when the account information included in the authentication request is not stored in the user management table 308, user authentication is failed. In this example, since the user information of the user U1 is not stored in the user management table 308 of the relay apparatus 30B, user authentication is failed. In step S203, the CPU 301 transmits to a different relay apparatus 30, that is, the relay apparatuses 30A and 30C, the authentication request received from the client apparatus 20C. In order to avoid complication, the relay apparatus 30C is not illustrated in FIG. 7.

The CPU 301 of the relay apparatus 30A receives the authentication request from the relay apparatus 30B. In step S204, the CPU 301 of the relay apparatus 30A performs user authentication in response to the received authentication request. In this example, since the user information of the user U1 is stored in the user management table 308 of the relay apparatus 30A, user authentication is successful. In step S205, the CPU 301 of the relay apparatus 30A transmits to the relay apparatus 30B an authentication result indicating that user authentication has been successful. Regarding the relay apparatus 30C, since the user information of the user U1 is not stored in the user management table 308 of the relay apparatus 30C, user authentication is failed. The CPU 301 of the relay apparatus 30C transmits to the relay apparatus 30B an authentication result indicating that user authentication has been failed.

The CPU 301 of the relay apparatus 30B receives the authentication results from the relay apparatus 30A and the relay apparatus 30C. Since the authentication result indicating that user authentication has been successful is received from the relay apparatus 30A, in step S206, the CPU 301 of the relay apparatus 30B transmits to the client apparatus 20C the authentication result indicating that user authentication has been successful. When the client apparatus 20C receives an authentication result indicating that user authentication has been successful, the process proceeds to step S207. In contrast, when the client apparatus 20C receives an authentication result indicating that user authentication has been failed, the process is terminated without performing the subsequent processing. In this example, the client apparatus 20C receives an authentication result indicating that user authentication has been successful at the relay apparatus 30A, and the process proceeds to step S207.

In step S207, the client apparatus 20C transmits to the relay apparatus 30B an access request to the service providing apparatus 10. The access request includes information including the user ID of the user U1 and the type of a service to be provided by the service providing apparatus 10.

The CPU 301 of the relay apparatus 30B receives the access request from the client apparatus 20C. The CPU 301 transmits a token acquisition request to the relay apparatus 30 in which a token corresponding to the user ID included in the received access request is stored, that is, the home relay apparatus 30 in the home region of the user U1. The home relay apparatus 30 in the home region of the user U1 corresponds to the relay apparatus 30 from which the authentication result indicating that user authentication has been successful is transmitted in step S205. That is, in step S208, the CPU 301 of the relay apparatus 30B transmits to the relay apparatus 30A an acquisition request for the token corresponding to the user ID included in the received access request. This acquisition request includes the user ID included in the received access request. The CPU 301 of the relay apparatus 30A reads from the user management table 308 the token corresponding to the user ID included in the acquisition request received from the relay apparatus 30B. In step S209, the CPU 301 of the relay apparatus 30A transmits the read token to the relay apparatus 30B. However, the CPU 301 of the relay apparatus 30A may be configured to issue a token update request for the read token to the corresponding service providing apparatus 10, acquire the updated token issued from the service providing apparatus 10, and transmit the updated token to the relay apparatus 30B in step S209.

In step S210, the CPU 301 of the relay apparatus 30B determines whether or not there is a need to update the token received from the relay apparatus 30A. In this example, when the term of validity of the received token satisfies a predetermined condition, the CPU 301 determines that the token needs to be updated. More specifically, for example, when the term of validity of the token has expired or when the remaining term of validity of the token is shorter than a predetermined threshold, the CPU 301 determines that the token needs to be updated. When the token needs to be updated, the CPU 301 proceeds to processing of step S211. In contrast, when the token does not need to be updated, the CPU 301 skips the processing of steps S211 and S215, and the process proceeds to step S216.

The service providing apparatus 10 issues a token in response to the request from the relay apparatus 30. When the token needs to be updated, the service providing apparatus 10 receives an update request from the relay apparatus 30 from which a token issuance request has been issued, whereas the service providing apparatus 10 does not receive an update request from the other relay apparatuses 30 (the relay apparatuses 30 from which a token issuance request has not been issued) is not received. That is, the system 1 is not able to cause an apparatus from which a token issuance request has not been issued to the service providing apparatus 10 to request the service providing apparatus 10 to update the token. In this example, since the relay apparatus 30B is not a relay apparatus from which issuance of a token necessary for allowing the user U1 to access the service providing apparatus 10 has been requested, the relay apparatus 30B is not able to request the service providing apparatus 10 to update the token. Thus, in this example, the relay apparatus 30B requests the relay apparatus 30A, which includes the token of the user U1, to update the token.

In step S211, the CPU 301 of the relay apparatus 30B transmits a token update request to the relay apparatus 30A. The relay apparatus 30A receives the token update request from the relay apparatus 30B. In step S212, the relay apparatus 30A transmits the token update request to the service providing apparatus 10. The service providing apparatus 10 issues a new token in response to the update request from the relay apparatus 30A. In step S213, the service providing apparatus 10 transmits the issued token to the relay apparatus 30A. The CPU 301 of the relay apparatus 30A receives the updated token from the service providing apparatus 10. In step S214, the CPU 301 of the relay apparatus 30A transmits the received token to the relay apparatus 30B.

The CPU 301 of the relay apparatus 30B receives the updated token from the relay apparatus 30A. In step S215, the CPU 301 of the relay apparatus 30B caches the received token in a predetermined cache region. In step S216, the CPU 301 transmits to the service providing apparatus 10 the updated token and the access request received from the client apparatus 20C in step S207. The service providing apparatus 10 receives the access request and the token, and determines, based on the received token, whether or not to permit access to the service providing apparatus 10. In step S217, when the service providing apparatus 10 permits access to the service providing apparatus 10, the service providing apparatus 10 performs processing corresponding to the received access request. For example, the service providing apparatus 10 performs processing regarding the service corresponding to the type of the service included in the received access request.

When an access request to the service providing apparatus 10 is received from the user U1 again, the relay apparatus 30B transmits an access request to the service providing apparatus 10 by using the token stored in the cache in step S215. That is, regarding the second and later access requests, the relay apparatus 30B accesses the service providing apparatus 10 by using the token stored in the cache, without issuing a token acquisition request to the relay apparatus 30A.

In this exemplary embodiment, when a user intends to use a service of a service providing apparatus 10 with an away client apparatus 20 in an away region of the user, an away relay apparatus 30 in the away region acquires a token from a home relay apparatus 30 in a home region of the user, and update of the token is requested if the token necessary for accessing the service providing apparatus 10 satisfies a predetermined condition. Therefore, for example, even when the term of validity of a token stored in the home region of the user has expired or the remaining term of validity is short, access to the service providing apparatus 10 is still available.

3. Modifications

The exemplary embodiments described above are merely aspects of the present invention. The foregoing exemplary embodiments may be modified as described below. Furthermore, the modifications described below may be combined together.

3-1. Modification 1

The system 1 according to the foregoing exemplary embodiments includes the service providing apparatuses 10A, 10B, and 10C, the client apparatuses 20A, 20B, 20C, and 20D, and the relay apparatuses 30A, 30B, and 30C. However, the numbers of the service providing apparatuses 10, the client apparatuses 20, and the relay apparatuses 30 are not limited to the numbers illustrated in the system 1.

3-2. Modification 2

In the foregoing exemplary embodiments, account information and a token of each user is stored as user information in the user management table 308. However, user information stored in the user management table 308 is not limited to this. For example, user information may include information indicating attributes of a user (a department to which the user belongs, a place at which the user works, a region to which the user belongs, etc.).

3-3. Modification 3

In the foregoing exemplary embodiments, when the term of validity of a token received from the relay apparatus 30A satisfies a predetermined condition, the CPU 301 of the relay apparatus 30B in an away region of the user U1 determines that the token needs to be updated. However, the determination as to whether or not to update a token is not limited to the above. For example, the CPU 301 may determine whether or not an access request received from the client apparatus 20C satisfies a predetermined condition.

For example, the determination may be performed in accordance with the type of a service included in the access request. In this case, a table in which the type of a service provided by the service providing apparatus 10 and the processing time required for the service are associated with each other is stored in advance in the storage 304 of the relay apparatus 30B. The CPU 301 of the relay apparatus 30B identifies, by referring to the table stored in the storage 304, the processing time corresponding to the type of the service included in the access request received from the client apparatus 20C. When the identified processing time exceeds a predetermined threshold, the CPU 301 determines that the term of validity of the token needs to be updated.

Furthermore, the determination according to the foregoing exemplary embodiments (that is, the determination using a token) and the determination using the access request may be combined together and used. For example, when the term of validity of a token satisfies a predetermined condition and the processing time corresponding to the type of a service included in an access request exceeds a predetermined threshold, the CPU 301 may determine that the term of validity of the token needs to be updated.

Furthermore, all the tokens may be requested to be updated, without causing the CPU 301 of the relay apparatus 30B to determine whether or not to update a token.

3-4. Modification 4

In the foregoing exemplary embodiments, when the CPU 301 of the home relay apparatus 30A in the home region of the user U1 receives a token update request from the relay apparatus 30B in the away region in step S211, the CPU 301 of the relay apparatus 30A may determine whether or not to update the token.

For example, the CPU 301 may determine whether or not to update the token, in accordance with the type of a region corresponding to the relay apparatus from which the update request has been transmitted. In this case, a table in which the type of the region and a flag indicating whether or not to permit an update request from the region are associated with each other is stored in advance in the storage 304 of the relay apparatus 30A. When the relay apparatus 30A receives an update request from a different relay apparatus 30, the CPU 301 of the relay apparatus 30A determines, by referring to the table, whether or not to permit updating.

3-5. Modification 5

In the foregoing exemplary embodiments, when a home relay apparatus 30 in a home region receives token update requests from plural different relay apparatuses 30, the home relay apparatus 30 may select any one of the plural different relay apparatuses 30 and dispose of the update requests from the other relay apparatuses 30. For example, when the home relay apparatus 30 receives update requests from plural away relay apparatuses 30 in away regions within a predetermined period of time, the CPU 301 of the home relay apparatus 30 may perform update processing for the first received update request and dispose of the second and the subsequent update requests. For example, in another example, when plural update requests are received within a predetermined period of time, the CPU 301 may perform update processing for the last received update request and dispose of the other update requests.

Furthermore, when the home relay apparatus 30 receives a token update request from the plural away relay apparatuses 30, the terms of validity and the range of authorization of tokens may be varied for the individual relay apparatuses 30 from which the update request has been transmitted. For example, when the relay apparatus 30A receives a token update request from the relay apparatus 30B and then receives a token update request from the relay apparatus 30C, the CPU 301 of the relay apparatus 30A may change the tokens so that the range of authorization of the token to be transmitted to the relay apparatus 30C is narrower than the range of authorization of the token to be transmitted to the relay apparatus 30B.

3-6. Modification 6

When a home relay apparatus 30 in a home region receives a token acquisition request from an away relay apparatus 30 in an away region, the home relay apparatus 30 may change the token to be transmitted to the away relay apparatus 30 so that the range of authorization of the token is narrower than the case where the home relay apparatus 30 directly accesses the service providing apparatus 10.

3-7. Modification 7

In the foregoing exemplary embodiment, an away relay apparatus 30 in an away region transmits an authentication request to a different relay apparatus 30 (step S203 in FIG. 7), and a relay apparatus 30 from which an authentication result indicating that user authentication has been successful is transmitted in step S205 is defined as a home relay apparatus 30 in a home region. However, a method for identifying the home relay apparatus 30 is not limited to this. For example, with a configuration in which a table indicating the correspondence between a user and a home region is registered in advance in an away relay apparatus 30 in an away region, the away relay apparatus 30 may identify the home relay apparatus 30 in the home region, by referring to the table.

3-8. Modification 8

In the foregoing exemplary embodiments, a program executed by the CPU 301 of the relay apparatus 30 may be downloaded via a communication line, such as the Internet. Furthermore, the program may be recoded in a computer-readable recording medium, such as a magnetic recording medium (a magnetic tape, a magnetic disk, etc.), an optical recording medium (an optical disk etc.), a magneto-optical recording medium, or a semiconductor memory, and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay apparatus comprising:
at least one hardware processor configured to execute modules comprising:
a storage configured to store, for each user, authorization information for accessing a service providing apparatus;
a first receiver configured to receive from a client apparatus an access request including a request for access to the service providing apparatus and identification information for identifying the user;
a first requestor configured to issue, when authorization information generated by the service providing apparatus and corresponding to the identification information included in the received access request is not stored in the storage, an acquisition request for the authorization information to a different relay apparatus;
a second receiver configured to receive authorization information generated by the service providing apparatus and transmitted from the different relay apparatus as a response to the acquisition request;
a second requestor configured to request, when at least any one of the received authorization information and the received access request satisfies a predetermined condition, the different relay apparatus to update the received authorization information;

a third receiver configured to receive updated authorization information generated by the service providing apparatus and transmitted from the different relay apparatus as a response to the update request; and an accessor configured to access the service providing apparatus by using the received updated authorization information.

2. The relay apparatus according to claim 1, wherein when a term of validity of the authorization information received by the second receive satisfies a predetermined condition, the second requestor is further configured to request the different relay apparatus to update the received authorization information.

3. The relay apparatus according to claim 1, wherein when a processing time required for a service corresponding to the received access request is equal to or more than a predetermined threshold, the second requestor is further configured to request the different relay apparatus to update the received authorization information.

4. The relay apparatus according to claim 1, wherein the authorization information for accessing the service providing apparatus comprises a token.

5. A relay apparatus comprising:
at least one hardware processor configured to execute modules comprising:
a storage configured to store, for each user, authorization information for accessing a service providing apparatus;
a receiver configured to receive an acquisition request for authorization information from a different relay apparatus;
a first transmitter configured to read from the storage unit authorization information corresponding to the received acquisition request and transmit the read authorization information to the different relay apparatus; and
a second transmitter configured to transmit, when receiving an update request for the authorization information from the different relay apparatus, to the service providing apparatus an update request for the authorization information corresponding to the received update request, and transmit to the different relay apparatus updated authorization information transmitted from the service providing apparatus.

6. The relay apparatus according to claim 5, wherein when receiving update requests for a piece of authorization information from a plurality of different relay apparatuses, the second transmitter is further configured to transmit the updated authorization information to any one of the plurality of different relay apparatuses.

7. The relay apparatus according to claim 5, wherein the second transmitter is further configured to change the authorization information so that authorization indicated by the authorization information transmitted from the service providing apparatus is restricted.

8. The relay apparatus according to claim 5, wherein the second transmitter is further configured to determine, in accordance with a type of a different relay apparatus from which an update request for the authorization information has been transmitted, whether or not to permit updating of the authorization information.

9. The relay apparatus according to claim 5, wherein the first transmitter is further configured to transmit to the service providing apparatus an update request for the read authorization information, and transmits to the different relay apparatus the updated authorization information transmitted from the service providing apparatus.

10. A system comprising:
a first relay apparatus; and
a second relay apparatus,
wherein the first relay apparatus includes:
a first hardware processor configured to execute modules comprising:
a first storage configured to store, for each user, authorization information for accessing a service providing apparatus,
a first receiver configured to receive from a client apparatus an access request including a request for access to the service providing apparatus and identification information for identifying the user,
a first requestor configured to issue, when authorization information generated by the service providing apparatus and corresponding to the identification information included in the received access request is not stored in the first storage, an acquisition request for the authorization information to the second relay apparatus,
a second receiver configured to receive authorization information generated by the service providing apparatus and transmitted from the second relay apparatus as a response to the acquisition request,
a second requestor configured to request, when at least any one of the received authorization information and the received access request satisfies a predetermined condition, the second relay apparatus to update the received authorization information,
a third receiver configured to receive updated authorization information generated by the service providing apparatus and transmitted from the second relay apparatus as a response to the update request, and
an accessor configured to access the service providing apparatus by using the received updated authorization information, and
wherein the second relay apparatus includes
a second hardware processor configured to execute modules comprising:
a second storage configured to store, for each user, authorization information for accessing the service providing apparatus,
a fourth receiver configured to receive an acquisition request for the authorization information from the first relay apparatus,
a first transmitter configured to read from the second storage authorization information generated by the service providing apparatus and corresponding to the received acquisition request and transmits the read authorization information to the first relay apparatus, and
a second transmitter configured to transmit, when receiving an update request for the authorization information from the first relay apparatus, to the service providing apparatus an update request for the authorization information corresponding to the received update request, and transmit to the first relay apparatus updated authorization information transmitted from the service providing apparatus.

11. A relay method comprising:
storing, for each user, authorization information for accessing a service providing apparatus;
receiving from a client apparatus an access request including a request for access to the service providing apparatus and identification information for identifying the user;

issuing, when authorization information generated by the service providing apparatus and corresponding to the identification information included in the received access request is not stored, an acquisition request for the authorization information to a different relay apparatus;

receiving authorization information generated by the service providing apparatus and transmitted from the different relay apparatus as a response to the acquisition request;

requesting, when at least any one of the received authorization information and the received access request satisfies a predetermined condition, the different relay apparatus to update the received authorization information;

receiving updated authorization information generated by the service providing apparatus and transmitted from the different relay apparatus as a response to the update request; and accessing the service providing apparatus by using the received updated authorization information.

12. A relay method comprising:

storing, for each user, authorization information for accessing a service providing apparatus;

receiving an acquisition request for authorization information from a different relay apparatus;

reading authorization information corresponding to the received acquisition request and transmitting the read authorization information to the different relay apparatus; and transmitting, when receiving an update request for the authorization information from the different relay apparatus, to the service providing apparatus an update request for the authorization information corresponding to the received update request, and transmitting to the different relay apparatus updated authorization information transmitted from the service providing apparatus.

13. A non-transitory computer readable medium storing a program causing a computer to execute a relay process, the process comprising:

storing, for each user, authorization information for accessing a service providing apparatus;

receiving from a client apparatus an access request including a request for access to the service providing apparatus and identification information for identifying the user;

issuing, when authorization information generated by the service providing apparatus and corresponding to the identification information included in the received access request is not stored, an acquisition request for the authorization information to a different relay apparatus;

receiving authorization information generated by the service providing apparatus and transmitted from the different relay apparatus as a response to the acquisition request;

requesting, when at least any one of the received authorization information and the received access request satisfies a predetermined condition, the different relay apparatus to update the received authorization information;

receiving updated authorization information generated by the service providing apparatus and transmitted from the different relay apparatus as a response to the update request; and accessing the service providing apparatus by using the received updated authorization information.

14. A non-transitory computer readable medium storing a program causing a computer to execute a relay process, the process comprising:

storing, for each user, authorization information for accessing a service providing apparatus;

receiving an acquisition request for authorization information from a different relay apparatus;

reading authorization information corresponding to the received acquisition request and transmitting the read authorization information to the different relay apparatus; and transmitting, when receiving an update request for the authorization information from the different relay apparatus, to the service providing apparatus an update request for the authorization information corresponding to the received update request, and transmitting to the different relay apparatus updated authorization information transmitted from the service providing apparatus.

* * * * *